United States Patent
Lee (10) Patent No.: US 7,248,833 B2
(45) Date of Patent: Jul. 24, 2007

(54) METHOD AND APPARATUS FOR ENCRYPTING AND DECRYPTING DATA IN WIRELESS LAN

(75) Inventor: Jin Kyoo Lee, Seongnam (KR)

(73) Assignee: LG Electronics Inc., Seoul (KR)

( * ) Notice: Subject to any disclaimer, the term of this patent is extended or adjusted under 35 U.S.C. 154(b) by 821 days.

(21) Appl. No.: 10/397,112

(22) Filed: Mar. 26, 2003

(65) Prior Publication Data
US 2004/0203591 A1    Oct. 14, 2004

(30) Foreign Application Priority Data
Mar. 29, 2002    (KR)    ............... 10-2002-0017508

(51) Int. Cl.
*H04B 7/00*    (2006.01)
(52) U.S. Cl. ............... 455/41.2; 455/41.3; 455/552.1; 455/553.1; 455/556.1; 455/556.2; 370/338; 380/239

(58) Field of Classification Search ............... 455/41.2, 455/41.3, 552.1, 553.1, 556.1, 556.2; 370/338; 380/239
See application file for complete search history.

(56) References Cited

U.S. PATENT DOCUMENTS

| | | | | |
|---|---|---|---|---|
| 5,987,062 A | * | 11/1999 | Engwer et al. | ............ 375/225 |
| 6,055,316 A | * | 4/2000 | Perlman et al. | ............ 380/262 |
| 7,039,190 B1 | * | 5/2006 | Engwer et al. | ............ 380/270 |

\* cited by examiner

*Primary Examiner*—Quynh H. Nguyen
(74) *Attorney, Agent, or Firm*—Lee, Hong, Degerman, Kang & Schmadeka (57) ABSTRACT

An apparatus and a method for encrypting and decrypting data in a wireless LAN includes additional blocks for generating key sequence by a secret key and generating key sequence by ICV in order to solve disadvantages of conventional WEP apparatus and method for encrypting/decrypting data suggested by IEEE 802.11, and the key sequence by the ICV is dual-encrypted by XOR operated with the transmission data, and thereby, wiretapping and sensing from outer side can be blocked.

9 Claims, 6 Drawing Sheets

METHOD AND APPARATUS FOR ENCRYPTING AND DECRYPTING DATA IN WIRELESS LAN

BACKGROUND OF THE INVENTION

1. Field of the Invention

The present invention relates to a method and an apparatus for encrypting and decrypting data in a wireless Local Area Network (LAN), and particularly, to a method and an apparatus for encrypting and decrypting data in a wireless LAN for compensating disadvantages of wired equivalent privacy (WEP) method used in IEEE 802.11 standard.

2. Description of the Background Art

Generally, a cryptography is a method for preventing data transmitted/received in a communication system from being wiretapped or being forged by someone. In the above method, data is encrypted before the data is transmitted, and a receiving party receives the encrypted data and decrypts it.

In applying the above cryptography, since wireless Local Area Network (LAN) has weaker security than that of wired LAN, such a place where the security system is operated does not use the wireless LAN. Therefore, reference of Institute of Electrical and Electronics Engineers (IEEE) 802.11 suggested an encrypting/decrypting method of wired equivalent privacy (WEP).

In the encrypting/decrypting method in the IEEE 802.11 standard, a transmitter makes a key sequence using a discretionary key and transmits the data after XOR operating the key sequence with the data which will be transmitted, and a receiver decrypts by XOR operating the same key sequence to the received data.

As described above, the WEP provides a mechanism protecting stream of wireless LAN data, and uses symmetric algorithm that the data is encrypted/decrypted using same key and algorithm. The above method will be described in more detail as follows with reference to accompanying Figures.

Figure 1:
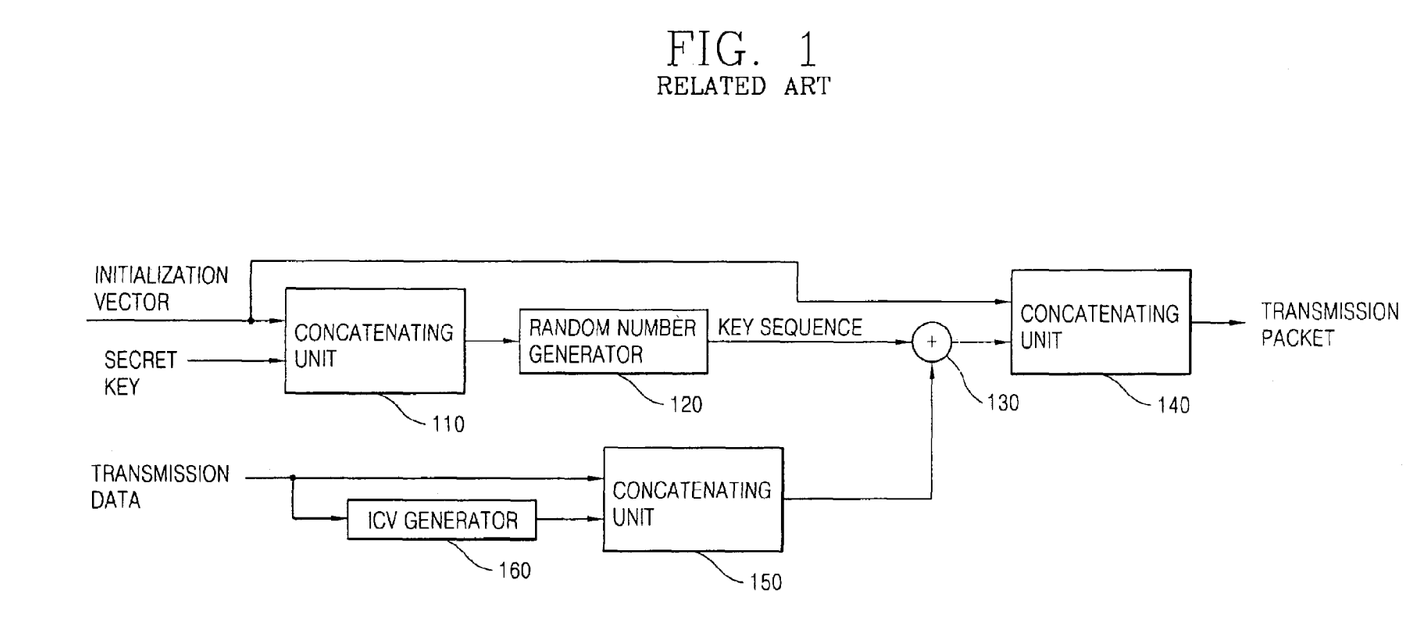
FIG. 1 is a block diagram showing a data encrypting apparatus in a wireless LAN applying WEP according to the conventional art.

FIG. 1 is a block diagram showing a data encrypting apparatus in the wireless LAN applied by the WEP according to the conventional art.

As shown therein, the encrypting apparatus comprises: a concatenating unit 110 for outputting a sequence by concatenating an initialization vector and a secret key; a random number generator 120 for generating a key sequence after being seeded the sequence; an ICV generator 160 for generating Integrity Check Value (ICV) using an integrity algorithm in order to decide integrity of data (plain text) which will be transmitted; a concatenating unit 150 concatenating the ICV sequence outputted from the ICV generator 160 and the transmission data, and then, outputting the concatenated result; an XOR operator 130 for XOR operating the key sequence generated in the random number generator 120 and the sequence outputted from the concatenating unit 150; and a concatenating unit 140 for concatenating the sequence XOR operated in the XOR operator 130 and the initialization vector and outputting it as a transmission packet form.

The encrypting method in the wireless LAN system according to the conventional art will be described in more detail as follows.

First, the concatenating unit 110 concatenates the initialization vector (IV) and a secret key. Then, the random number generator 120 generates the key sequence using the concatenated sequence as a seed.

In addition, the concatenating unit 150 concatenates the data which will be transmitted with the ICV which is used for deciding whether or not the received data (plain text) is changed in a decrypting apparatus. At that time, the ICV is generated by the integrity algorithm in the ICV generator 160, and functions as a cyclic redundancy checking (CRC).

After that, the XOR operator 130 generates concatenated data (plain text+ICV) concatenated in the concatenating unit 150 and encrypted data (that is, Ciphertext) which is encrypted by XOR operating with the key sequence generated in the random number generator 120. The encrypted data is concatenated with the initialization vector (IV), and it becomes the final transmission packet. Herein, since the initialization vector (IV) is used to make same key sequence in the decrypting apparatus, it is not encrypted. The transmission packet is shown in FIG. 2.

Figure 2:
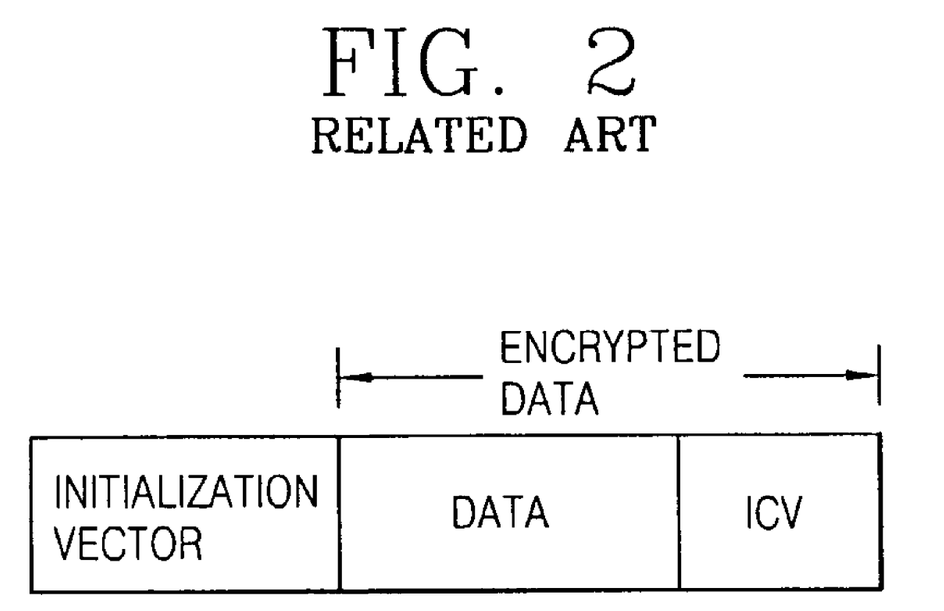
FIG. 2 is a detailed view showing a transmission packet in FIG. 1.

FIG. 2 is a detailed view showing the transmission packet in FIG. 1.

As shown therein, the transmission packet is transmitted to a channel (not shown) in a form that the initialization vector, transmission data and the ICV are concatenated. At that time, the transmission data is concatenated with the ICV and encrypted once.

The encrypted data described above can be represented as following equation (1).

$$C = P \odot \text{Random}(\text{secret key}, IV) \qquad \text{equation (1)}$$

Herein, C represents encrypted transmission data, P is original transmission data, $\odot$ means XOR operation, and Random (Secret key, IV) means a function generating key sequence using the initialization vector (IV) and the secret key as seeds.

Figure 3:
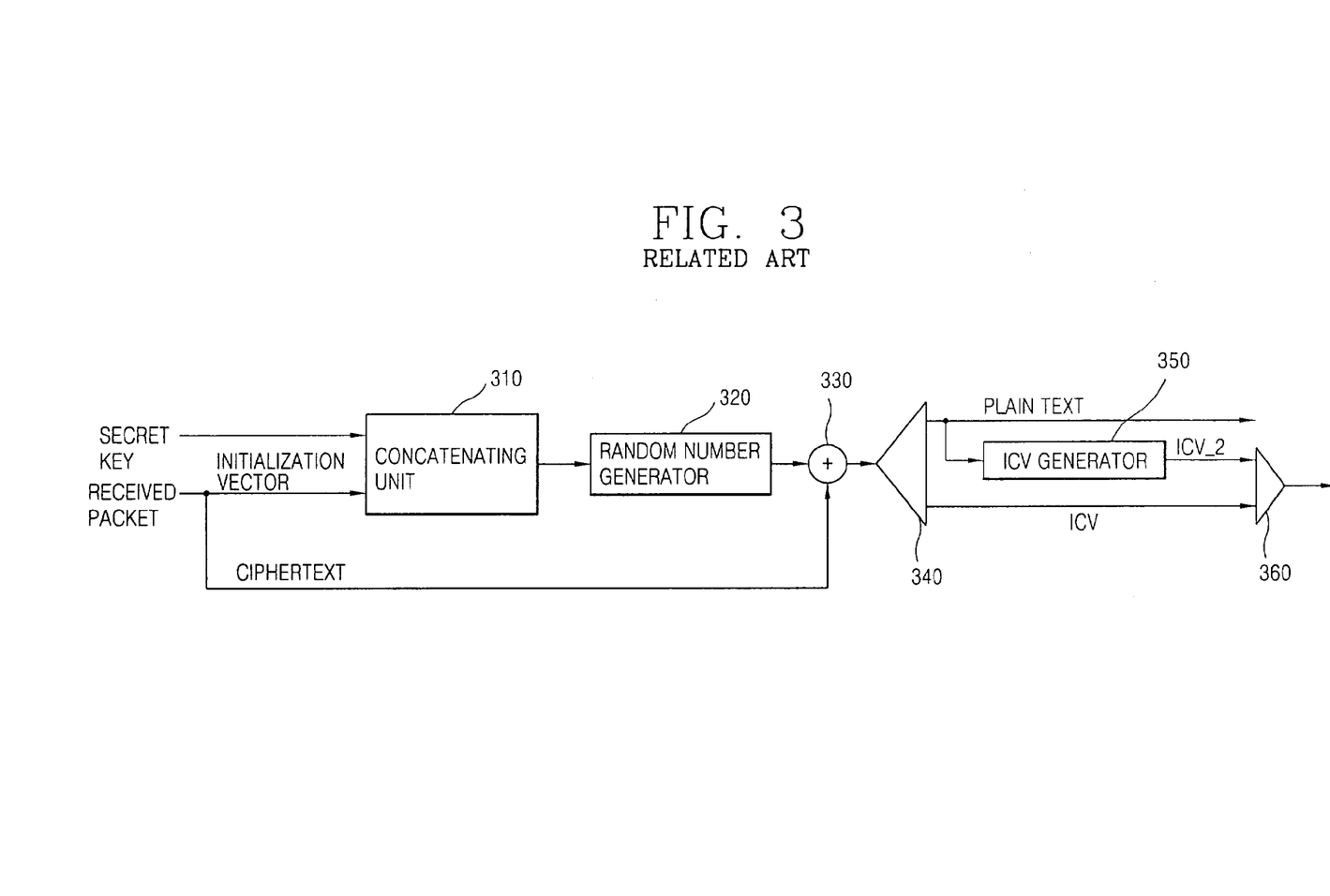
FIG. 3 is a block diagram showing a data decrypting apparatus in a wireless LAN applying the WEP according to the conventional art.

Therefore, when the finally generated transmission packet is transmitted through a channel, the decrypting apparatus constructed as FIG. 3 receives the transmission packet and decrypts the original data.

FIG. 3 is a block diagram showing the decrypting apparatus in the wireless LAN applied by the WEP according to the conventional art.

As shown therein, the decrypting apparatus comprises: a concatenating unit 310 for concatenating a secret key including same sequence as that of the transmitted secret key with the initialization vector of the received packet; a random number generator 320 generating a key sequence after being inputted the sequence concatenated in the concatenating unit 310; an XOR operator 330 for XOR operating the encrypted data (Ciphertext) and the key sequence; a divider 340 receiving the XOR operated sequence and dividing it into the data (plain text) and the ICV; an ICV generator 350 receiving the decrypted data and generating ICV_2 based on the data; and a comparing device 360 comparing the ICV to the ICV_2, and outputting the decrypted data if the ICV and the ICV_2 are coincided with each other.

The data decrypting method in the wireless LAN applied by the WEP according to the conventional art will be described as follows.

First, the concatenating unit 310 concatenates the initialization vector of the received packet and the secret key. Then, the random generator 320 generates the key sequence using the concatenated sequence as a seed.

The XOR operator 330 XOR operates the received encrypted data and the above key sequence, and the divider 340 divides the XOR operated sequence into the data (plain text) and the ICV. At that time, the ICV generator 350 generates the ICV_2 based on the data. Then, the comparing device 360 compares the ICV_2 to the ICV, and then, decides the above data as the data transmitted from the encrypting apparatus.

Above processes are performed as inverse processes of the encrypting processes, and the processes can be identified through following equation.

That is, since C=P⊙ Random(Secret key, IV) in equation (1), $$C \odot \text{Random(Secret key, IV)} = [P \odot \text{Random(Secret key, IV)}] \odot \text{Random(Secret key, IV)}$$
$$= P \odot [\text{Random(Secret key, IV)}] \odot \text{Random(Secret key, IV)}]$$
$$= P \odot 0$$
$$= P$$

Herein, C represents encrypted receive packet, P represents original transmission data, ⊙ means XOR operation, and Random (Secret key, IV) is a function for generating key sequence using the initialization vector (IV) and the secret key as seeds.

However, according to the conventional WEP encrypting method described above, in case that two transmission data different from each other are encrypted using the same secret key and the initialization vector, sum of two transmission data P1 and P2 which are not encrypted can be identified by XOR operating the two encrypted data C1 and C2.

That is, the above process can be represented as following equation.

C1=P1⊙Random(Secret key,IV)

C2=P2⊙Random(Secret key,IV)

C1⊙C2=[P1⊙Random(Secret key,IV)]⊙[P1⊙Random(Secret key,IV)]=P1⊙P2

At that time, P1 and P2 can be calculated easily from the sum of the two transmission data which are not encrypted (P1⊙ P2), and therefore, P1 and P2 can be obtained easily by monitoring from outer side. In order to prevent above problem, IEEE 802.11 suggests the initialization vector should be changed periodically, however, does not refer detailed method.

Also, even if the initialization vector is changed periodically, same key sequence should be used since the length of the initialization vector is limited to be 24 bits, and then, the changing type of the initialization vector can be exposed easily.

Also, IEEE 802.11 standard transmits the initialization vector without encrypting the vector, and therefore, security for the initialization vector is not made perfectly.

SUMMARY OF THE INVENTION

Therefore, an object of the present invention is to provide an apparatus and a method which are able to prevent wiretapping and recognizing from outer side by dual-encrypting data, which will be transmitted, unlike conventional WEP method in order to strengthen security function and to compensate disadvantages of the WEP method suggested by IEEE 802.11 standard.

Also, another object of the present invention is to provide an apparatus and a method which are able to, prevent initialization information and periodical changing method from being wiretapped using encrypting method for the initialization vector (IV).

To achieve the objects of the present invention, as embodied and broadly described herein, there is provided an encrypting apparatus in a wireless LAN, which performs encryption of data by XOR operating a key sequence generated using an initialization vector and a secret key as seeds with transmission data and with ICV concatenated data and by generating final transmission packet after concatenating the data calculated from the XOR operation with the initialization vector, comprising: a first encrypting unit for encrypting the transmission data using the ICV; and a second encrypting unit for encrypting the transmission data which is encrypted by the first encrypting unit using the initialization vector and the secret key.

Also, to achieve the objects of the present invention, there is provided a data decrypting apparatus in a wireless LAN, which performs decryption of transmission data (plain text) by concatenating the initialization vector and the secret key of received packet, generating a key sequence using the concatenated sequence as a seed, and then by XOR operating the encrypted data of the received packet with the key sequence, comprising: a first decrypting unit generating the key sequence using the sequence in which the initialization vector and the secret key is concatenated as a seed, and XOR operating the key sequence with the encrypted data (Ciphertext) of the received packet; and a second decrypting unit for decrypting the data decrypted in the first decrypting unit to be the transmission data using the ICV.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to an apparatus and a method for encrypting/decrypting of the present invention, a block generating key sequence by a secret key and a block generating key sequence by ICV are added in order to solve disadvantages of WEP encrypting/decrypting apparatus and method suggested by IEEE 802.11, and the key sequence by the ICV is XOR operated with the transmission data to dual-encrypt it. This will be described in more detail with reference to accompanying Figures.

Figure 4:
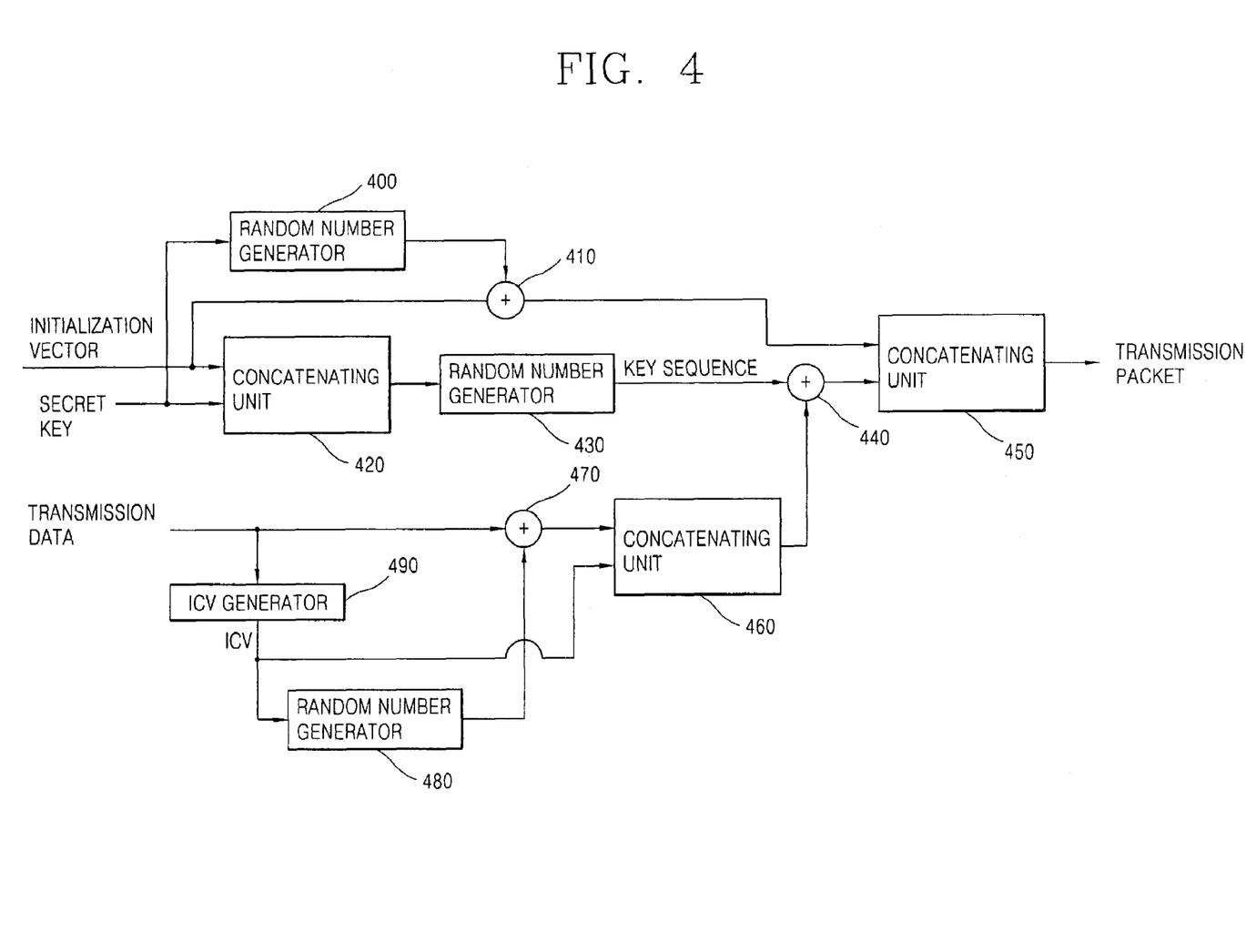
FIG. 4 is a block diagram showing a data encrypting apparatus in a wireless LAN applying WEP according to the present invention.

FIG. 4 is a block diagram showing a data encrypting apparatus in a wireless LAN applying WEP according to the present invention.

As shown therein, the encrypting apparatus comprises: a concatenating unit 420 outputting a sequence by concatenating an initialization vector and a secret key; a random number generator 430 generating a key sequence after being seeded the above sequence; a random number generator 400 for generating a sequence by being seeded the secret key; an XOR operator 410 for XOR operating the sequence generated in the random number generator 400 with the initialization vector; an ICV generator 490 generating a value using an integrity algorithm in order to decide integrity of the data (plain text) which will be transmitted; a random number generator 480 generating a sequence using the ICV outputted from the ICV generator 490 as a seed; an XOR operator 470 for XOR operating the sequence generated in the random number generator 480 with the transmission data; a concatenating unit 460 concatenating the XOR operated sequence in the XOR operator 470 and the transmission data, and after that, outputting it as encrypted data (Ciphertext); an XOR operator 440 for XOR operating a key sequence generated from the random number generator 430 with the encrypted data; and a concatenating unit 450 for concatenating the XOR operated sequence in the XOR operator 440 and the XOR operated sequence in the XOR operator 410, and outputting it as a transmission packet form.

Operations of the data encrypting apparatus in the wireless LAN applying the WEP according to the present invention will be described as follows.

First, the random number generator 400 is seeded the secret key to generate a sequence, and the XOR operator 410 XOR operates the generated sequence with the initialization vector (IV) to encrypt the initialization vector.

The concatenating unit 420 concatenates the initialization vector (IV) and the secret key. Then, the random number generator 430 generates the key sequence using the concatenated sequence as a seed.

In addition, the ICV generator 490 generates the ICV by a integrity algorithm after being seeded the transmission data. Then, the random number generator 480 generates a sequence using the ICV as a seed and inputs the sequence into the XOR operator 470. The XOR operator 470 XOR operates the transmission data and the sequence generated in the random number generator 480 and outputs it into the concatenating unit 460.

The concatenating unit 460 receives the ICV outputted from the ICV generator 490 and the sequence outputted from the XOR operator 470, and then concatenates these two. Then, the XOR operator 440 XOR operates the sequence outputted from the concatenating unit 460 with the key sequence to generate encrypted data, that is, Ciphertext. The generated encrypted data is concatenated with the initialization vector (IV) encrypted in the concatenating unit 450, and it becomes the final transmission packet.

Figure 5:
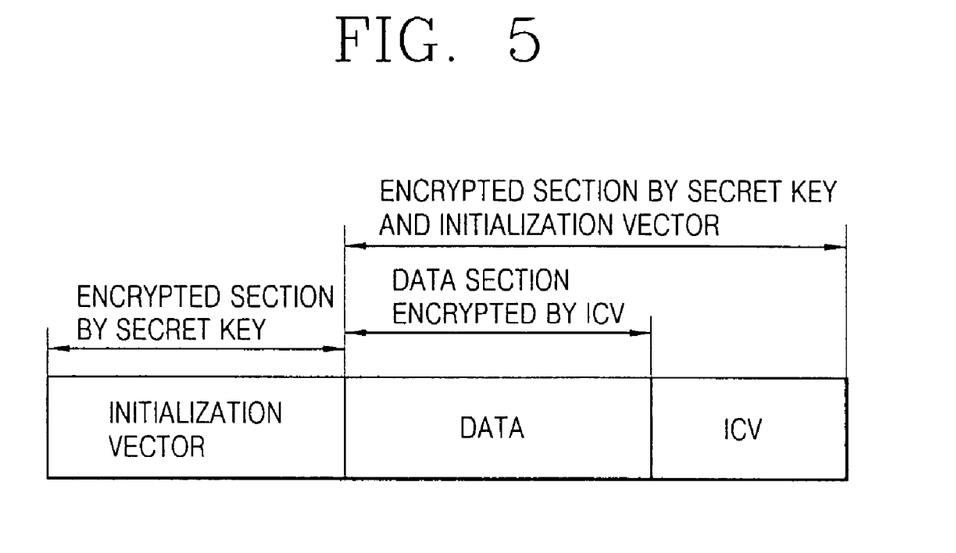
FIG. 5 is a detailed view showing a transmission packet in FIG. 4.

As described above, the encrypting apparatus dually encrypts the data, which will be transmitted, and the structure of the transmission packet is shown in FIG. 5.

FIG. 5 is a detailed view showing the transmission packet in FIG. 4.

As shown therein, the transmission packet is transmitted to a channel (not shown) in a form that the initialization vector (IV), the transmission data and the ICV are concatenated. At that time, the transmission data portion is encrypted firstly by the ICV, and the, encrypted secondly by the secret key and the initialization vector. And the ICV is encrypted once by the secret key and the initialization vector.

The data transmitted in the above encrypting method can be represented as following equation (4).

$$C = P \odot \text{Random}(ICV) \odot \text{Random}(\text{Secret key}, IV) \quad \text{equation (4)}$$

Herein, C represents the dual-encrypted transmission data, P is original transmission data, $\odot$ means XOR operation, and Random(ICV) represents the key sequence generated by using the ICV as a seed, and the Random(Secret key, IV) represents the key sequence generated by using the initialization vector (IV) and the secret key as seeds.

Therefore, the encrypting method according to the present invention is able to solve the problems of conventional art as in following equation.

$$C1 = P1 \odot \text{Random}(ICV) \odot \text{Random}(\text{Secret key}, IV)$$

$$C2 = P2 \odot \text{Random}(ICV\_2) \odot \text{Random}(\text{Secret key}, IV)$$

$$C1 \odot C2 = [P1 \odot \text{Random}(ICV) \odot \text{Random}(\text{Secret key}, IV)] \odot$$

$$[P2 \odot \text{Random}(ICV\_2) \odot \text{Random}(\text{Secret key}, IV)]$$

$$= [P1 \odot \text{Random}(ICV)] \odot [P2 \odot \text{Random}(ICV\_2)]$$

$$= P1 \odot P2$$

As shown in above equation, even though the different encrypted data having same secret key and initialization vector are XOR operated, these are still encrypted by the ICV and ICV_2. Therefore, the wiretapping from outer side can be blocked by preventing the sum of transmission data (plain text) from being obtained, and thereby, the security function can be strengthened.

Also, the initialization vector is transmitted in the state that the vector is not encrypted in the conventional art, however, the present invention includes the encryption for the initialization vector (IV).

Figure 6:
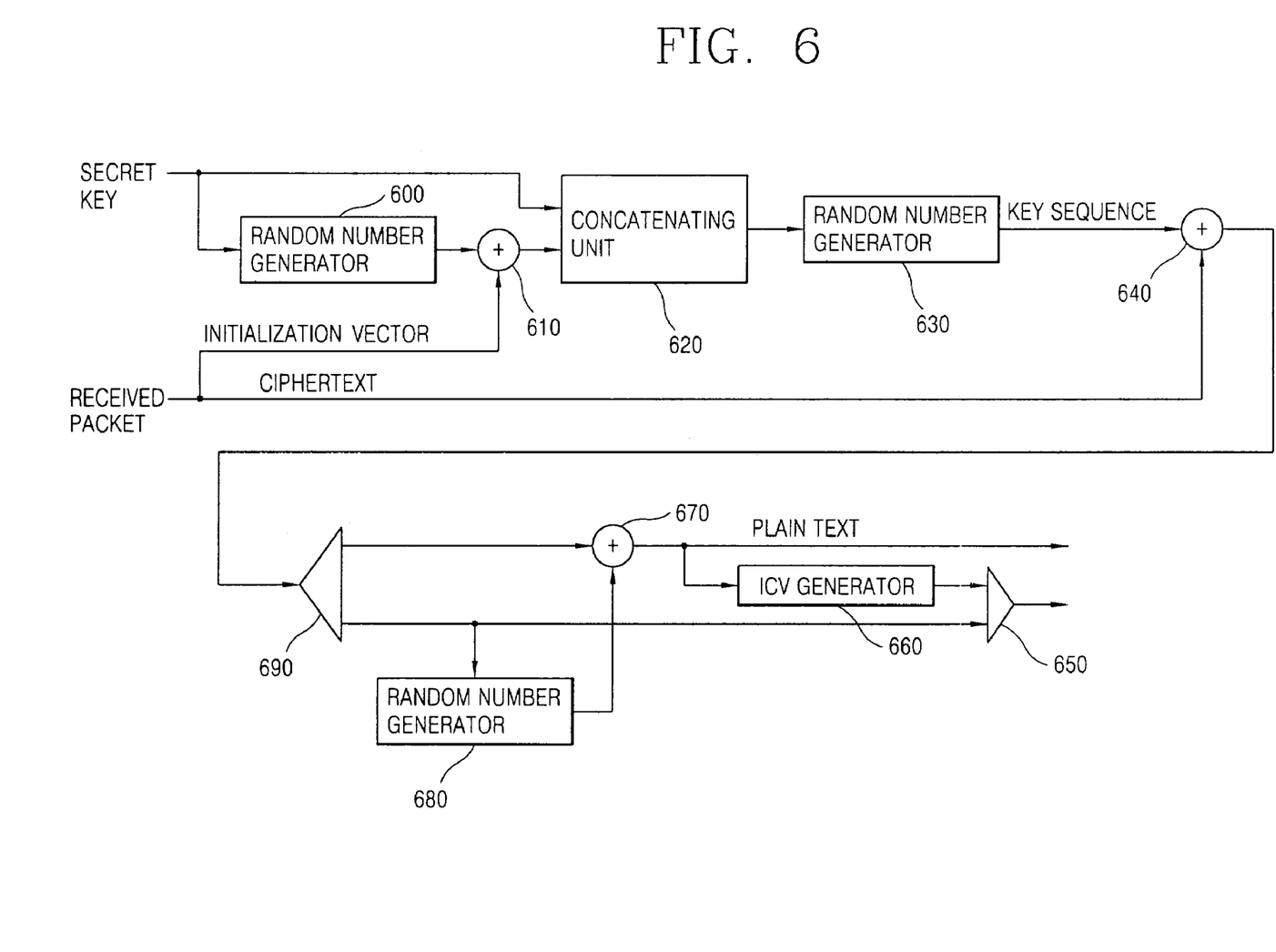
FIG. 6 is a block diagram showing a data decrypting apparatus in a wireless LAN applying the WEP according to the present invention.

Therefore, when the finally generated transmission packet is transmitted through a channel, the decrypting apparatus constructed as FIG. 6 receives the transmission packet and decrypts the encrypted data.

The decrypting apparatus is also similar to that suggested by the IEEE 802.11 standard, however, a block generating the key sequence using the ICV as a seed and a block generating the key sequence by the secret key are also added as in the encrypting apparatus of the present invention.

FIG. 6 is a block diagram showing the data decrypting apparatus in the wireless LAN applying the WEP according to the present invention.

As shown therein, the decrypting apparatus comprises: a random number generator 600 generating a sequence using a secret key including same sequence as that of the transmitted secret key as a seed; an XOR operator 610 for XOR operating the random number generator 600 and the initialization vector of the received packet; a concatenating unit 620 for concatenating the XOR operated sequence and the receive secret key; a random number generator 630 generating a key sequence after being seeded the sequence concatenated in the concatenating unit 620; an XOR operator 640 for XOR operating the encrypted data (Ciphertext) and the key sequence; a divider 690 for dividing the XOR operated sequence into data (plain text encrypted by the ICV) and the ICV; a random number generator 680 for generating a sequence using the divided ICV as a seed; an XOR operator 670 for XOR operating the sequence generated in the random number generator 680 with the divided data; an ICV generator 660 receiving the XOR operated data (plain text) and generating ICV_2 based on the data; and a comparing device 650 comparing the ICV to the ICV_2 and outputting the decrypted data if the ICV and ICV_2 are coincided with each other.

The decrypting method of the decrypting apparatus constructed as above will be described as follows.

First, the random number generator 600 generates a sequence using the secret key as a seed. At that time, the secret key includes same sequence as that of the secret key used in the encrypting apparatus. Then, the XOR operator 610 XOR operates the sequence generated in the random number generator 600 with the initialization vector. The XOR operator 610 XOR operates the sequence with the encrypted initialization vector to decrypt the initialization vector.

The concatenating unit 620 concatenates the XOR operated sequence and the secret key. Then, the random number generator 630 generates the key sequence using the concatenated sequence as a seed. After that, the XOR operator 640 XOR operates the key sequence with the received data (plain text encrypted by the ICV) to decrypt the data.

That is, the secret key and the initialization vector (not encrypted) of the received packet are inputted into the concatenating unit 620, and then outputted as the sequence in which the secret key and the initialization vector are concatenated. In addition, the above sequence is inputted into the random number generator 630, and then, the same key sequence as the sequence generated in the random number generator 430 of the encrypting apparatus is generated. The above key sequence is XOR operated with the dual-encrypted data (Ciphertext) of the receive packet in the XOR operator 640. Then, password by the initialization vector and the secret key is decrypted to decrypt the ICV, and the encrypted data becomes firstly encrypted status (that is, the status encrypted by the ICV). The data outputted from the XOR operator 640 is divided into the ICV and the firstly encrypted data in the divider 690.

That is, the divider 690 divides the XOR operated sequence into the data (plain text encrypted by the ICV) and the ICV. Then, the random number generator 680 receives the divided ICV to generate the sequence, the XOR operator 670 XOR operates the sequence generated in the random number generator 680 and the firstly encrypted data to decrypt the transmission data encrypted by the ICV into the data before transmission.

Also, the ICV generator 660 generates the ICV_2 based on the decrypted data, and the comparing device 650 compares the ICV_2 to the ICV. At that time, when the ICV and the ICV_2 are coincided with each other, it means that there is no error in the received data. However, if these two are not coincided, it means that the received data is damaged or distorted.

The above processes are performed as reverse processes of the encrypting, and the process can be identified through following equation.

That is, since C=P⊙ Random(ICV)⊙ Random(Secret key, IV), $$\begin{aligned}C \odot \text{Random}(\text{Secret key, IV}) \odot \text{Random}(\text{ICV}) &= [P \odot \text{Random}(\text{ICV}) \odot \\ &\quad \text{Random}(\text{Secret key, IV})] \odot \\ &\quad \text{Random}(\text{Secret key, IV}) \odot \\ &\quad \text{Random}(\text{ICV}) \\ &= P\end{aligned}$$

As described above, the present invention is able to compensate the disadvantages of the WEP method suggested by IEEE 802.11 standard, and to strengthen the security function. That is, according to the present invention, the data which will be transmitted is dual-encrypted unlike the conventional WEP method, and therefore, the wiretapping and sensing from outer side can be blocked.

Also, according to the present invention, the cryptography is used for the initialization vector (IV), and therefore, the wiretapping for the information of initialization vector and for the periodical changing type can be prevented.

Also, the present invention has similar configuration to that of the conventional WEP method, and therefore, the present invention can be realized only by modifying the conventional hardware or software slightly.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A data encrypting apparatus, comprising:
    a first encrypting unit for encrypting data based on an Integrity Check Value (ICV); and
    a second encrypting unit for encrypting the data which is encrypted by the ICV based on an initialization vector and a secret key,
    wherein, encryption of data is performed by XOR operating a key sequence generated by seeding the initialization vector and the secret key with transmission data and with the ICV concatenated data.

2. The apparatus of claim 1, wherein the first encrypting unit comprises:
    an ICV generator for receiving transmission data and generating an ICV which is for deciding integrity of the transmission data (plain text);
    a first random number generator for generating a sequence by seeding an ICV outputted from the ICV generator;
    a first XOR operator for XOR operating the sequence generated in the first random number generator with the transmission data;
    a first concatenating unit for concatenating the sequence outputted from the first XOR operator and the transmission data outputted from the ICV generator.

3. The apparatus of claim 1, wherein the second encrypting unit comprises:
    a second concatenating unit for concatenating the initialization vector with the secret key and outputting a concatenated sequence;

a second random number generator for generating a key sequence by seeding the concatenated sequence; and a second XOR operator for XOR operating the key sequence with the sequence outputted from the first encrypting unit.

4. The apparatus of claim 1 further comprising:

an initialization vector encrypting unit for generating a random number sequence by seeding the secret key, and XOR operating the random number sequence with the initialization vector.

5. A data decrypting apparatus, comprising:

a first decrypting unit for decrypting data based on an initialization vector and a secret key, wherein the data is encrypted based on an Integrity Check Value (ICV), the initialization vector and the secret key; and a second decrypting unit for decrypting the decrypted data based on the ICV, wherein, decryption of transmission data is performed by concatenating the initialization vector and the secret key of a received packet, generating a key sequence by seeding the concatenated sequence, and then by XOR operating the encrypted data of the received packet with the key sequence.

6. The apparatus of claim 5, further comprising:

an initialization vector decrypting unit for generating a random number sequence by seeding the secret key, and after that, XOR operating the random number sequence with the initialization vector of the receive packet.

7. The apparatus of claim 6, wherein the second decrypting unit comprises:

a divider for dividing the XOR operated sequence in the first decrypting unit into a data which is encrypted with the ICV and an ICV;

a random number generator for generating a sequence by seeding the ICV; and an XOR operator for XOR operating the sequence generated in the random number generator with the data.

8. A method for encrypting data in a wireless Local Area Network (LAN), which performs encryption of data by XOR operating a key sequence generated by seeding an initialization vector and a secret key, and concatenating the data obtained by the XOR operation and the initialization vector to generate a final transmission packet, comprising:

a first step for generating the key sequence by seeding an Integrity Check Value (ICV);

a second step for XOR operating the key sequence generated in the first step with the transmission data;

a third step for concatenating the data obtained in the second step and the ICV;

a fourth step for XOR operating the concatenated data of the third step with the key sequence generated by seeding the initialization vector and the secret key; and a fifth step for generating a final transmission packet by concatenating the data calculated in the fourth step and the initialization vector, wherein the fifth step generates the final transmission packet by generating the key sequence by seeding the secret key, and by concatenating data, which is obtained by XOR operating the above key sequence with the initialization vector, and the data obtained in the fourth step.

9. A data decrypting method in a wireless Local Area Network (LAN), which decrypts transmission data by concatenating initialization vector and a secret key, generating a key sequence by seeding using the sequence, and XOR operating encrypted data of receive packet with the key sequence, comprising:

a first step for generating a random number sequence by seeding the secret key, and after that, XOR operating the sequence with the initialization vector of the receive packet;

a second step for generating key sequence by seeding the sequence in which the initialization vector and the secret key are concatenated, and XOR operating the key sequence with the encrypted data of the receive packet; and a third step for decrypting the data which is decrypted in the first step into the transmission data using an Integrity Check Value (ICV), wherein the third step divides the XOR operated sequence into the data and ICV, generates a sequence by seeding the divided ICV, and XOR operates the generated sequence with the data.

* * * * *